United States Patent
Innes et al.

(10) Patent No.: US 10,826,695 B2
(45) Date of Patent: *Nov. 3, 2020

(54) BLOCKCHAIN-BASED SOCIAL MEDIA HISTORY MAPS

(71) Applicant: AT&T Intellectual Property I, L.P., Atlanta, GA (US)

(72) Inventors: Timothy Innes, Atlanta, GA (US); Bhumit Patel, Atlanta, GA (US); James Pratt, Round Rock, TX (US); Eric Zavesky, Austin, TX (US); Nigel Bradley, McDonough, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/456,766

(22) Filed: Jun. 28, 2019

(65) Prior Publication Data

US 2019/0327090 A1  Oct. 24, 2019

Related U.S. Application Data

(63) Continuation of application No. 15/616,625, filed on Jun. 7, 2017, now Pat. No. 10,341,105.

(51) Int. Cl.
*H04L 29/06* (2006.01)
*H04L 9/30* (2006.01)
(Continued)

(52) U.S. Cl.
CPC ............ *H04L 9/30* (2013.01); *G06F 16/182* (2019.01); *G06F 16/25* (2019.01); *G06Q 50/01* (2013.01);
(Continued)

(58) Field of Classification Search
CPC ............ H04L 63/1416; H04L 63/1408; H04L 63/1441; H04L 63/1458; G06F 21/552
(Continued)

(56) References Cited

U.S. PATENT DOCUMENTS 9,426,151 B2 * 8/2016 Richards ............ H04L 63/0861
9,436,923 B1    9/2016 Sriram et al.
(Continued)

FOREIGN PATENT DOCUMENTS

| AU | 2016101183 | 9/2016 |
|----|----|----|
| GB | 2540977 A | 2/2017 |
| WO | WO 2017/021154 | 2/2017 |

OTHER PUBLICATIONS

Zyskind, Guy, and Oz Nathan. "Decentralizing privacy: Using blockchain to protect personal data." Security and Privacy Workshops (SPW), 2015 IEEE. IEEE, 2015, 5 pages.
(Continued)

*Primary Examiner* — Evans Desrosiers
(74) *Attorney, Agent, or Firm* — Hartman & Citrin LLC

(57) ABSTRACT

A system may include a transaction history controller to store, in a distributed blockchain database, a first chain including a primary head node for a first subscriber to a social media history map service and multiple blocks each representing an online transaction for the first subscriber, and a second chain including a follower head node, linked to the primary head node, for a second subscriber and multiple blocks each representing an online transaction for the second subscriber. The transaction history controller may receive data representing a first online transaction for the second subscriber, format the data for the distributed blockchain database, store the formatted data as a new block in the second chain, receive a request to generate a trend report for a cluster of subscribers that includes the first and
(Continued)

second subscribers, and generate the trend report dependent on the blocks in the first and second chains.

20 Claims, 7 Drawing Sheets

(51) Int. Cl.
*G06Q 50/00* (2012.01)
*G06F 16/182* (2019.01)
*H04L 9/32* (2006.01)
*G06F 16/25* (2019.01)

(52) U.S. Cl.
CPC ........ *H04L 9/3239* (2013.01); *H04L 2209/38* (2013.01)

(58) Field of Classification Search
USPC .......................................................... 713/171
See application file for complete search history.

(56) References Cited

U.S. PATENT DOCUMENTS

| | | | |
|---|---|---|---|
| 9,635,000 B1 * | 4/2017 | Muftic | ...................... H04L 9/30 |
| 2015/0127940 A1 | 5/2015 | Polehn et al. | |
| 2015/0244690 A1 | 8/2015 | Mossbarger | |
| 2015/0310497 A1 | 10/2015 | Valin et al. | |
| 2016/0164884 A1 | 6/2016 | Sriram et al. | |
| 2016/0203572 A1 | 7/2016 | McConaghy et al. | |
| 2016/0283920 A1 | 9/2016 | Fisher et al. | |
| 2016/0292396 A1 | 10/2016 | Akerwall | |
| 2016/0300234 A1 | 10/2016 | Moss-Pultz et al. | |
| 2016/0321278 A1 | 11/2016 | Naqvi | |
| 2016/0321654 A1 | 11/2016 | Lesavich et al. | |
| 2016/0321675 A1 | 11/2016 | McCoy et al. | |
| 2016/0321769 A1 * | 11/2016 | McCoy | ................... G06F 21/10 |
| 2016/0364787 A1 | 12/2016 | Walker et al. | |
| 2016/0379256 A1 | 12/2016 | Salamon et al. | |
| 2017/0031874 A1 * | 2/2017 | Boudville | ............. H04L 9/3239 |
| 2017/0039330 A1 | 2/2017 | Tanner et al. | |
| 2017/0046689 A1 | 2/2017 | Lohe et al. | |
| 2017/0048235 A1 | 2/2017 | Lohe et al. | |
| 2017/0054611 A1 | 2/2017 | Tiell | |

OTHER PUBLICATIONS

Zyskind, Guy, Oz Nathan, and Alex Pentland. "Enigma: Decentralized computation platform with guaranteed privacy." arXiv preprint arXiv: 1506.03471 (2015), 14 pages.

Herbert, Jeff, and Alan Litchfield. "A Novel Method for Decentralised Peer-to-Peer Software License Validation Using Cryptocurrency Blockchain Technology." Proceedings of the 38th Australasian Computer Science Conference (ACSC 2015). vol. 159 Computer Science 2015, 9 pages.

Wilson, Duane, and Giuseppe Ateniese. "From pretty good to great: enhancing PGP using Bitcoin and the blockchain." International Conference on Network and System Security. Springer International Publishing, 2015, 18 pages.

O'Dair, Marcus, Zuleika Beaven, David Neilson, Richard Osborne, and Paul 3 Pacifico. "Music on the blockchain." Report No. Jul. 1, 2016, 29 pages.

U.S. Notice of Allowance dated Feb. 15, 2019 in U.S. Appl. No. 15/616,625.

* cited by examiner

BLOCKCHAIN-BASED SOCIAL MEDIA HISTORY MAPS

CROSS-REFERENCE TO RELATED APPLICATIONS

This application is a continuation of U.S. patent application Ser. No. 15/616,625 entitled "Blockchain-Based Social Media History Maps," filed Jun. 7, 2017, now U.S. Pat. No. 10,341,105, which is incorporated herein by reference in its entirety.

TECHNICAL FIELD

The present disclosure relates generally to social media history maps and more particularly to blockchain-based social media history maps.

BACKGROUND

Blockchains are generally digital data structures that facilitate recording digital information. A blockchain may serve as a public ledger for transactions. Using cryptography, blockchains allow participants to publish digital information in a secure and immutable way. More specifically, blockchains are designed to be resistant to modification of data once recorded and may not be altered retroactively.

Social media typically use web-based technologies, desktop computers, and mobile devices to create highly interactive platforms through which individuals, communities, and organizations can share, co-create, discuss, and modify user-generated content or pre-made content posted online. Social media applications are software applications that facilitate the creation and sharing of information, ideas, career interests and other forms of expression via virtual communities and networks. These software applications may include social networking applications, networking websites for business or industry communities, or internet-based services for posting content that is visible to "followers" in real time, including blogs or other internet-based forums. The information created or shared on social media applications is typically siloed by the application and/or platform on which it was created or shared.

SUMMARY

According to one embodiment, a system includes a distributed blockchain database. The distributed blockchain database includes a primary head node for a first subscriber to a social media history map service, two or more blocks in a first chain beginning from the primary head node, each block in the first chain representing a respective online transaction for the first subscriber, a follower head node for a second subscriber to the social media history map service, and two or more blocks in a second chain beginning from the follower head node, each block in the second chain representing a respective online transaction for the second subscriber. The second subscriber is a follower of the first subscriber on one or more social media platforms, and the follower head node is linked to the primary head node. The system also includes one or more processors having access to a memory subsystem. The memory subsystem stores instructions executable by the one or more processors that, when executed by the one or more processors, cause the one or more processors to implement a transaction history controller. The transaction history controller is configured to format data representing a first online transaction made on behalf of the second subscriber for compatibility with the distributed blockchain database, the data representing the first online transaction being from a first social media application, to store the formatted data representing the first online transaction in the distributed blockchain database as a first new block appended at the end of the second chain, the first new block representing the first online transaction, and to generate, in response to a request to generate a trend report for a cluster of subscribers to the social media history map service, the trend report dependent on the blocks in the first chain and the blocks in the second chain. The cluster of subscribers includes at least the first subscriber and the second subscriber.

According to another embodiment, a method includes storing, in a distributed blockchain database, data representing a primary head node for a first subscriber to a social media history map service, two or more blocks in a first chain beginning from the primary head node, each block in the first chain representing a respective online transaction for the first subscriber, data representing a follower head node for a second subscriber, and two or more blocks in a second chain beginning from the follower head node, each block in the second chain representing a respective online transaction for the second subscriber. The second subscriber is a follower of the first subscriber on one or more social media platforms, and the follower head node is linked to the primary head node. The method also includes receiving, by a transaction history controller from a first social media application, data representing a first online transaction for the second subscriber, formatting the data representing the first online transaction for compatibility with the distributed blockchain database, storing the formatted data representing the first online transaction in the distributed blockchain database as a first new block appended at the end of the second chain, the first new block representing the first online transaction, receiving a request to generate a trend report for a cluster of subscribers to the social media history map service, and generating the trend report dependent on the blocks in the first chain and the blocks in the second chain. The cluster of subscribers includes at least the first subscriber and the second subscriber.

According to yet another embodiment, at least one non-transitory computer-readable storage medium stores program instructions that when executed by one or more processors, cause the one or more processors to store, in a distributed blockchain database, data representing a primary head node for a first subscriber to a social media history map service, two or more blocks in a first chain beginning from the primary head node, each block in the first chain representing a respective online transaction for the first subscriber, data representing a follower head node for a second subscriber, and two or more blocks in a second chain beginning from the follower head node, each block in the second chain representing a respective online transaction for the second subscriber. The second subscriber is a follower of the first subscriber on one or more social media platforms, and the follower head node is linked to the primary head node. When executed by the one or more processors, the program instructions further cause the one or more processors to format data representing a first online transaction made on behalf of the second subscriber for compatibility with the distributed blockchain database, the data representing the first online transaction being from a first social media application, to store the formatted data representing the first online transaction in the distributed blockchain database as a first new block appended at the end of the second chain, the first new block representing the first online transaction, and to generate, in response to a request to generate a trend report for a cluster of subscribers to the social media history map service, the trend report dependent on the blocks in the first chain and the blocks in the second chain. The cluster of subscribers includes at least the first subscriber and the second subscriber.

BRIEF DESCRIPTION OF THE DRAWINGS

To assist in understanding the present disclosure, reference is now made to the following brief description, taken in connection with the accompanying drawings, in which.

DETAILED DESCRIPTION

Figure 1:
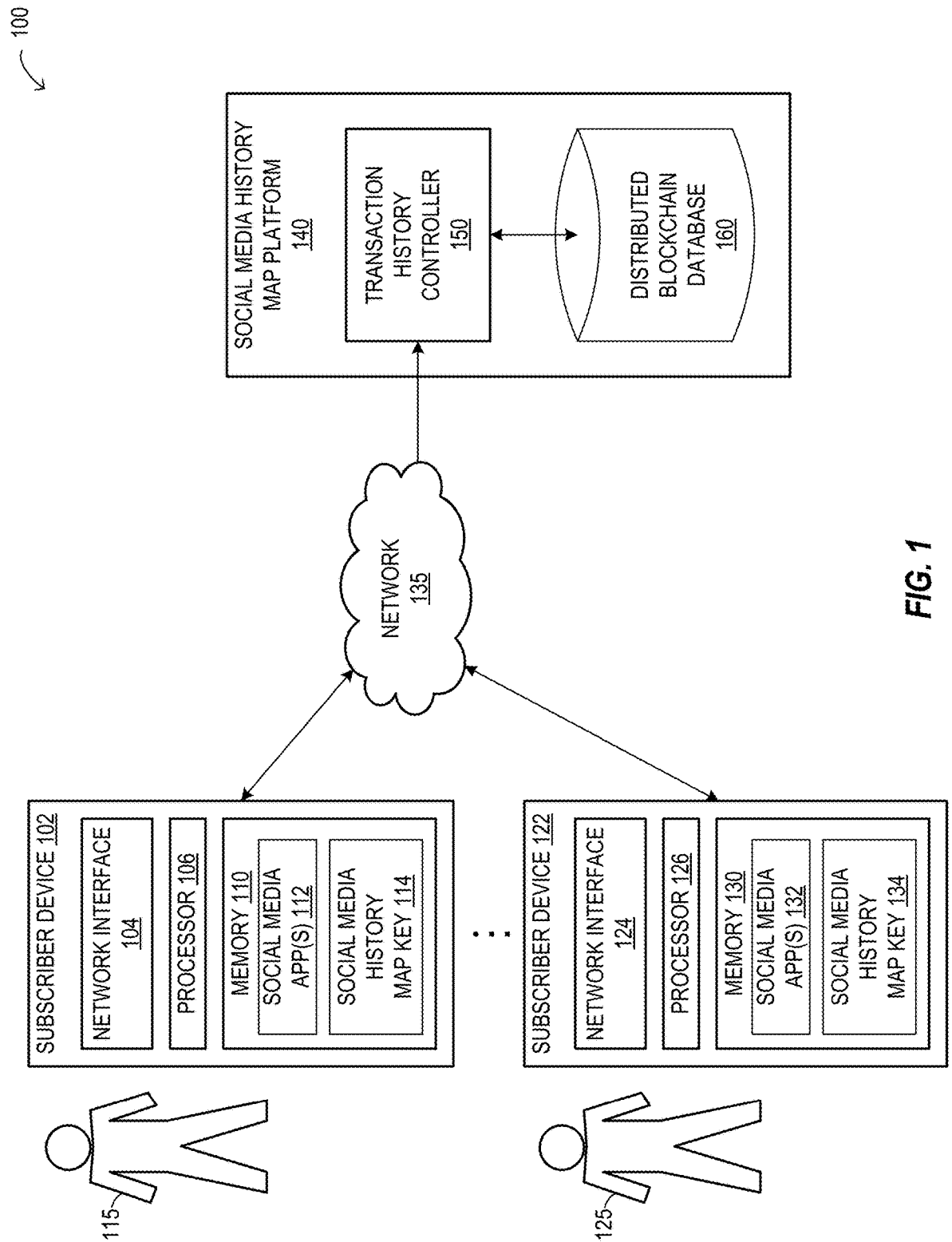
FIG. 1 is a block diagram illustrating an example embodiment of a system for implementing a blockchain-based social media history map service.

In certain embodiments, a social media history map platform may implement a blockchain-based social media history map service on behalf of multiple service subscribers. The social media history map platform may integrate blockchain transaction data accumulation into feeds from social media applications. In certain embodiments, social media may include computer-mediated technologies that facilitate the creation and sharing of information, ideas, career interests and other forms of expression via virtual communities and networks. Social media services typically include interactive, internet-based social media applications that allow users to create service-specific user profiles and to create and share content through online interactions with the services.

The information created or shared on social media applications is typically siloed by the application and/or platform on which it was created or shared. For example, if a user of multiple social media applications wants information about current trends at a particular time, information about the current trends at a particular location, or information about the behavior and activities of their friends, in general, at a particular location, or at a particular time, this information may not be available from a single media application. In general, the ability to track micro-culture transactions (i.e., a particular social media account including followers) by location, time and content may have enormous value in e-commerce, marketing, and targeted advertising.

As described above, blockchain technology uses a distributed database system with virtually tamper proof encryption schemes to create a permanent record of time stamped transactions. The social media history map platforms described herein may take advantage of the immutable and permanent nature of blockchain records to store, and provide access to, data representing online transactions that occur on multiple social media applications. However, instead of passing ownership of blocks or data between users, a social media account owner maintains primary ownership of his or her online transaction data. What passes from the social media account owner to other users of the social media history map service, such as followers of the social media account owner, is a notion of elevated visibility rights.

In certain embodiments, the social media history map platforms described herein may alter the traditional blockchain model to facilitate the use of temporary chain passwords, sometimes referred to herein as shared ownership visibility keys, to allow users other than the social media account owner to view a particular branch or sub-tree of the information stored in a distributed blockchain database. For example, in at least some embodiments, the data and/or metadata within each block in the distributed blockchain database may be encrypted such that it is not visible to others unless they have been provided with a corresponding shared ownership visibility key. In certain embodiments, all of the records stored in the distributed blockchain database may be minable at an aggregated and anonymous level. The visibility relationship between the social media account owners and their followers may be established using a two-way opt-in protocol for which the granularly is configurable. In certain embodiments, the granularity at which visibility is granted to the followers of a social media account owner may be as narrow as an individual online transaction or as broad as the entire online transaction history for the social media account owner.

In certain embodiments, the systems described herein may be used to quantify a type of demographic profile for a cluster of subscribers to a social media history map service, where the cluster of subscribers includes a collection of social media account owners and their followers who have established visibility relationships with each other. Such clusters of subscribers may sometimes be referred to as "social media clusters." In certain embodiments, once a user has registered a social media account with the social media history map service, the service itself may act as a type of follower of that user, and may extract data representing online transactions from feeds output by one or more social media applications associated with the registered social media account. In such embodiments, the service may reformat the extracted data for compatibility with the schema of the distributed blockchain database, such as for subsequent data mining operations, and may store this information as a new block in a chain of blocks representing online transactions for the user.

In various embodiments, the online transactions that are captured by social media application, and for which data is stored in the distributed blockchain database, may represent any type of online activity, whether the transaction is explicitly or implicitly made on behalf of a user. For example, online transactions for which data is stored in the distributed blockchain database may include shopping behaviors, the posting of content, attendance at events, or simply the presence of a user at a particular location. In general, any type of behavior or activity of a user may be captured as a "transaction" by a social media application or a utility application executing on a subscriber device and represented by data in a block in the distributed blockchain database. In certain embodiments, when a transaction for a service subscriber in a cluster of subscribers occurs or is detected by a social media application, and when data representing the transaction is pushed to the social media history map platform, the other members of the cluster may be notified automatically. In other embodiments, in order to view information about transactions that have occurred for a user within a cluster of subscribers, the other members of the cluster may submit a request for information to the social media history map service.

Figure 2:
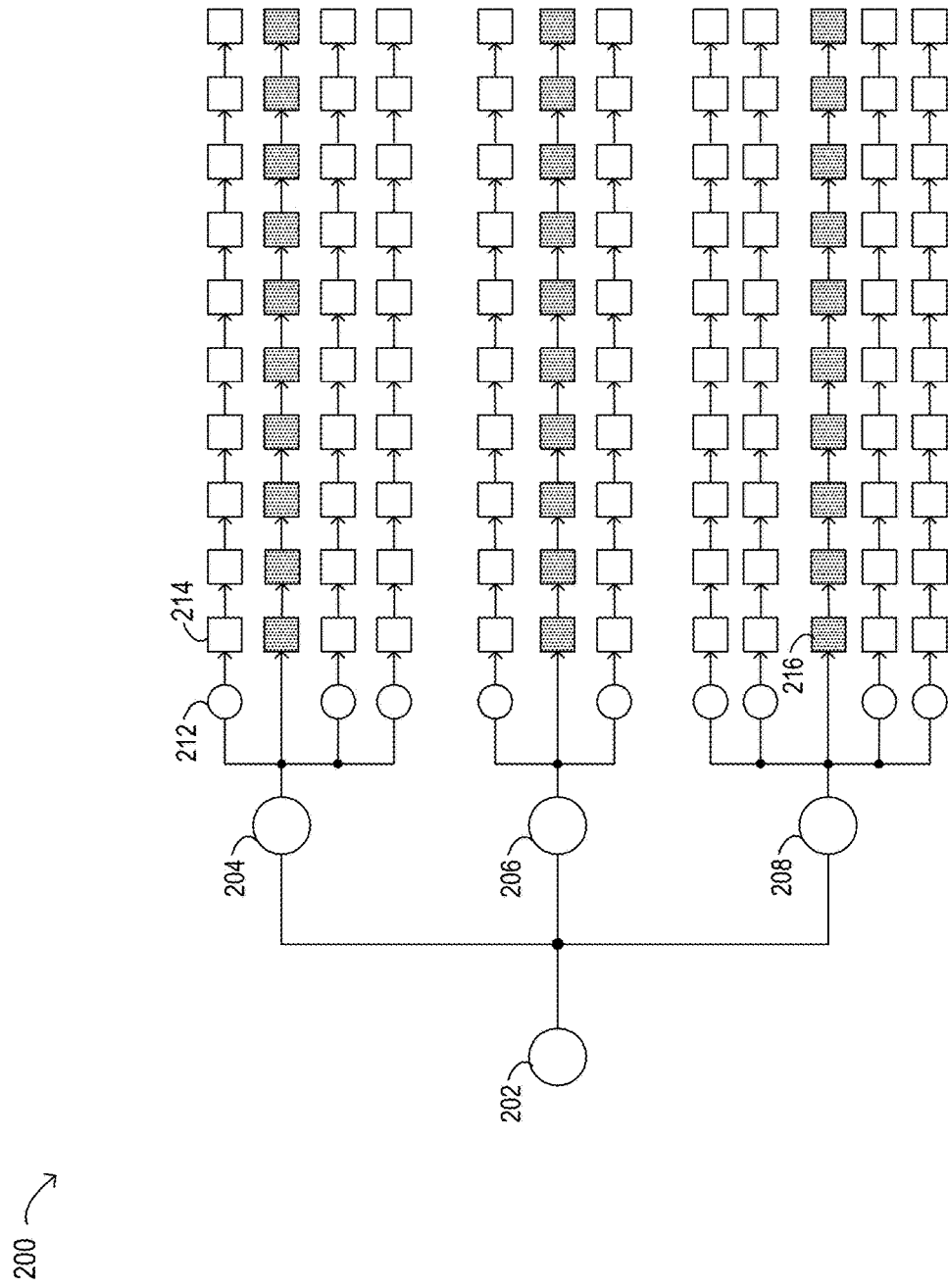
FIG. 2 illustrates an example social media history map data forest schematic, according to one embodiment.

FIG. 1 is a block diagram illustrating an example embodiment of a system 100 configured to implement a blockchain-based social media history map service. As described in more detail below, the social media history map service may integrate blockchain transaction data accumulation into social media feeds. Instead of transferring ownership of block in a chain, as in a traditional blockchain implementation, the service may confer visibility rights to the blocks in a chain to one or more users. The result is a data forest that represents online transaction histories in which a tree represents a social media account, and each branch of the tree represents the online transaction history of a follower of the social media account owner. An example of one such data forest is illustrated in FIG. 2 and described below.

As illustrated in FIG. 1, system 100 may include multiple users (such as users 115 and 125), each of which is associated with one or more subscriber devices (shown as devices 102 and 122, respectively) through which the user and the user's social media applications interact with the blockchain-based social media history map service. System 100 also includes network 135, and a social media history map platform 140. Users 115 and 125 may generally be users of system 100. More specifically, users 115 and 125 may be subscribers to a blockchain-based social media history map service provided by system 100. While two users are illustrated in FIG. 1, system 100 may include any number of users. Each user may be a social media account owner who has followers on one or more social media applications, a follower of a social media account owner, or both a social media account owner who has followers and a follower of another social media account owner. In one embodiment, user 125 may be a follower of user 115. In another embodiment, user 115 may be a follower of user 125. Each social media account for a user may be associated with one or more social media applications that are used by the user.

Subscriber devices, such as subscriber devices 102 and 122, may be any devices that a user of system 100 uses to operate and/or communicate with other components of system 100. For example, subscriber devices 102 and 122 may be any appropriate devices for sending and receiving communications over network 135. As an example and not by way of limitation, each of the subscriber devices 102 and 122 may be a desktop computer, a laptop computer, a wireless or cellular telephone, a notebook computer, a personal digital assistant, a tablet computer, or any other device capable of receiving, processing, storing, and/or communicating information with other components of system 100.

Figure 7:
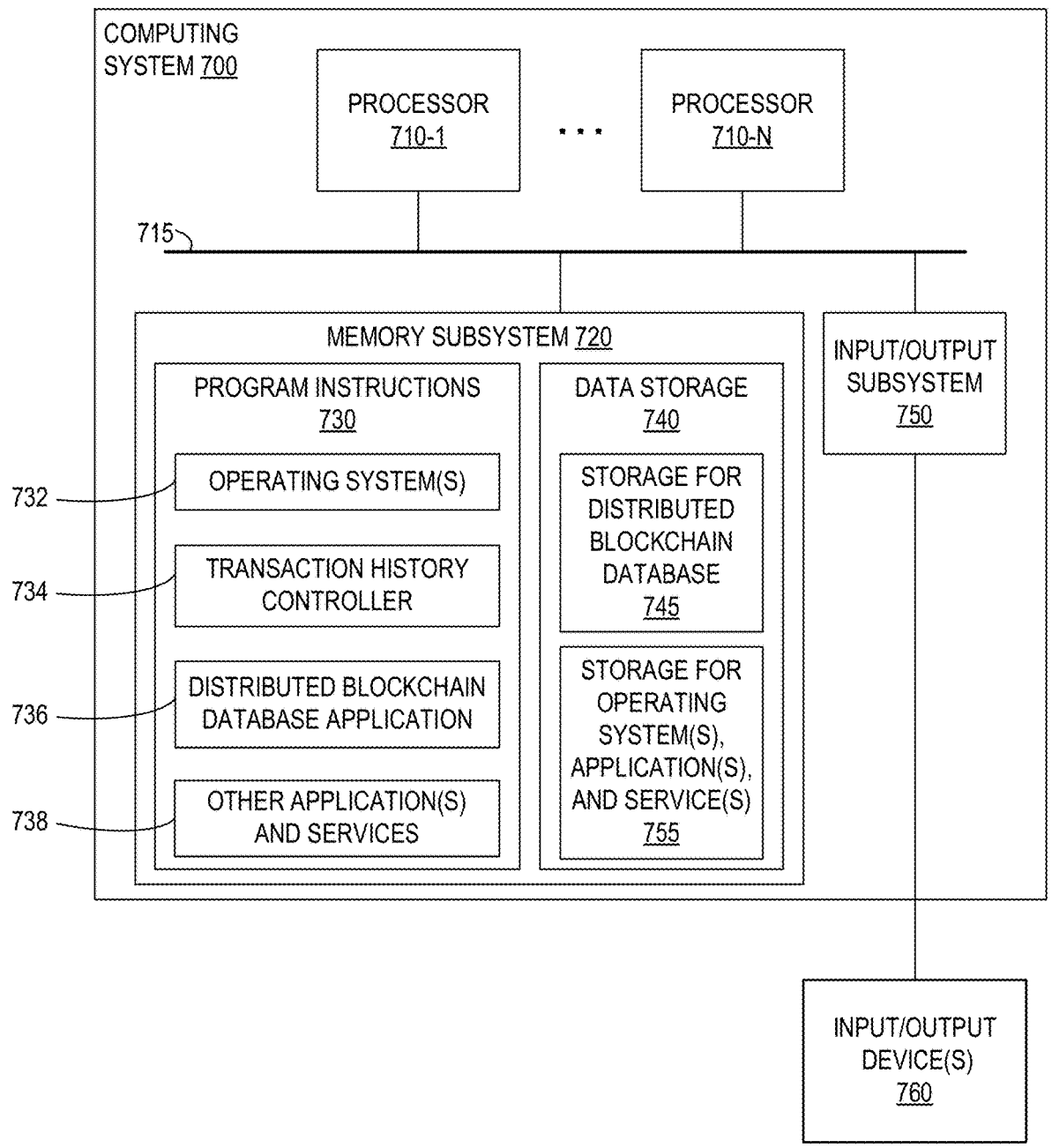
FIG. 7 is a block diagram illustrating an example embodiment of a computing system of a social media history map platform.

Each subscriber device may include some, none, or all of the components of computing system 700 illustrated in FIG. 7. For example, each of the subscriber devices 102 and 122 may include a network interface, a memory, and a processor. As illustrated in FIG. 1, subscriber device 102 includes a network interface 104, a processor 106, and a memory 110. Memory 110 includes program instructions that when executed by processor 106 to implement one or more social media applications 112. Social media applications 112 may include any of a variety of software applications through which individuals, communities and organizations can share, co-create, discuss, and modify user-generated content or pre-made content posted online. Memory 110 also stores data representing a social media history map key 114 for user 115. In various embodiments, social media history map key 114 may be any type of information used in public key cryptography or asymmetric cryptography systems. For example, social media history map key 114 may be a string of alphanumeric characters stored in a digital format, in some embodiments. In certain embodiments, the social media history map key 114 may be a shared ownership visibility key that allows followers of user 115 to view trend reports or other information generated from data stored in distributed blockchain database 160 and representing online transactions for a cluster of social media history map service subscribers that includes user 115. The cluster of social media history map service subscribers may also include one or more other users who follow, or are followed by, user 115 on one or more social media applications.

In the illustrated embodiment, subscriber device 122 includes a network interface 124, a processor 126, and a memory 130, which stores program instructions to implement one or more social media applications 132 and a social media history map key 134 for user 125. In certain embodiments, subscriber device 122 may be the same type of device as subscriber device 102 and may include program instructions to implement one or more of the same social media applications as those included in subscriber device 102. In other embodiments, subscriber device 122 may be a different type of device then subscriber device 102 and/or may include program instructions to implement more, fewer, or different social media applications than those included in subscriber device 102. Each of the subscriber devices 102 and 122 may also include a user interface, such as a display, a microphone, keypad, or other appropriate terminal equipment usable by a respective user (not shown in FIG. 1).

Network 135 facilitates communication between and amongst the various components of system 100. In various embodiments, network 135 may be any suitable network operable to facilitate communication between the components of system 100. Network 135 may include any interconnecting system capable of transmitting audio, video, signals, data, messages, or any combination of the preceding. Network 135 may include all or a portion of an ad hoc network, an intranet, an extranet, a virtual private network ("VPN"), a local area network ("LAN"), a wireless LAN ("WLAN"), a wide area network ("WAN"), a wireless WAN ("WWAN"), a metropolitan area network ("MAN"), a portion of the Internet, a portion of the Public Switched Telephone Network ("PSTN"), a cellular telephone network, including combinations thereof, operable to facilitate communication between the components. Network 135 may include one or more wireline links (such as, for example, Digital Subscriber Line ("DSL") or Data Over Cable Service Interface Specification ("DOCSIS")), wireless links (such as, for example, 2G, 3G, 4G, or 5G cellular, Wi-Fi, or Worldwide Interoperability for Microwave Access ("Wi-MAX")), or optical links (such as, for example, Synchronous Optical Network ("SONET") or Synchronous Digital Hierarchy ("SDH")), including combinations thereof.

As illustrated in FIG. 1, social media history map platform 140 may include a distributed blockchain database 160 and a transaction history controller 150. In certain embodiments, social media history map platform 140 may include one or more computing systems, an example of which is illustrated in FIG. 7 and described below. The computing systems may, collectively, implement a social media history map service for the benefit of one or more users, who may be subscribers to the service. In certain embodiments, distributed blockchain database 160 may be implemented as a decentralized and distributed digital ledger that records transactions across many computers in such a way that the registered transactions cannot be altered retroactively. For example, distributed blockchain database 160 may maintain one or more continuously growing lists of records, called blocks, that are secured from tampering and revision. Each block may include a timestamp and a link to a previous block in a list of blocks, forming a chain. Every head node or miner in the decentralized system may maintain a copy of the blockchain.

Similarly, an instance or a portion of a transaction history controller 150 may be instantiated on each of multiple computing systems to manage the social media history map data forest stored in distributed blockchain database 160 and to generate trend reports based on the stored data in response to requests from users of system 100. In some embodiments, transaction history controller 150 may include a collection of application programming interfaces (APIs), each of which is configured to accept secure input from a respective social media application or from social media applications that generate data in a respective format. For example, transaction history controller 150 may include multiple sub-controllers to receive, or otherwise obtain, data from multiple social media applications representing online transactions made on behalf of a user, to process the data by extracting information that is of interest in the context of the social media history map service, to reformat the data for compatibility with distributed blockchain database 160, and to store the reformatted data as new blocks in the appropriate chains within distributed blockchain database 160. Reformatting the data received from different social media applications into a consistent format for storage in distributed blockchain database 160 may allow transaction history controller 150 to run one or more services to extract, aggregate, and/or analyze portions of the data stored in distributed blockchain database 160. Specific functions of transaction history controller 150 are illustrated in FIGS. 3-6 and described in more detail below.

Modifications, additions, or omissions may be made to system 100 without departing from the scope of the disclosure. The various devices and components within system 100 may be combined or separated. For example, one or more subscriber devices may be combined. As another example, the functionality of any one device described herein may be performed by multiple devices. System 100 may include any number of users and subscriber devices. Each user may be associated with a single subscriber device or a plurality of subscriber devices may be associated with a single user. Any number of social media applications may be implemented by program instructions on any subscriber device for the benefit of a user of the subscriber device.

In certain embodiments, the social media history map platforms and services described may be agnostic in terms of the social media applications and/or platforms from which data representing online transactions are obtained. In some embodiments, a user of a social media history map service may sync their social media accounts to the service, which may allow all of the information in the feeds output by one or more social media applications associated with the social media accounts to be channeled to the social media history map service automatically. The social media history map service may filter, extract, consolidate, or aggregate the information obtained from the social media feeds and may store the information and/or the results of the filtering, extracting, consolidating, or aggregating in the distributed blockchain database. In certain embodiments, the distributed blockchain database may serve as a universal database for information created or shared using multiple social media applications, but existing outside of, and separate from, any of the social media applications.

As described herein, each subscriber to a social media history map service may be able to configure the visibility settings for the blocks that contain data representing their online transactions. A given subscriber may (for example, when registering a social media account) specify default visibility settings to be applied to their information when it is stored in the distributed blockchain database. For example, a default visibility parameter may specify a default granularity at which data within blocks representing online transactions of the given subscriber that are stored in the distributed blockchain database is visible by another subscriber that is followed by the given subscriber, followers of the other subscriber (other than the given subscriber), and followers of the given subscriber. In another example, a default visibility parameter may indicate whether data stored on behalf of the given subscriber in the distributed blockchain database is visible to subscribers in the cluster of subscribers other than the given subscriber on an individual online transaction basis or is visible to subscribers in the cluster of subscribers only in the aggregate, along with data stored in other blocks in the distributed blockchain database. In certain embodiments, the subscriber may (e.g., for certain social media applications or certain types of online transactions) override any default visibility settings by specifying different visibility grades for some of their information on an individual block basis, or for any collection of blocks in a chain or sub-chain associated with the subscriber.

In certain embodiments, while ownership of the individual blocks of data representing online transactions stored in the distributed blockchain database remains with the original social media account owner, enhanced visibility privileges may be transferred to their social media followers who opt-in to the system, giving them access to online purchase and behavior patterns in the form of trend data specific to their shared social media cluster.

In certain embodiments, a social media account owner and their followers may opt-in to an agreement that all their online transactions will be anonymized, aggregated, and classified by demographic classification, location and time. The result may be a system in which the term "trending topics" transcends the confines of generic population of application users. For example, when a subscriber to a blockchain-based social media history map service visits a shopping mall, the service may be able to generate and deliver to the subscriber information about the top ten trending purchases at the mall, the top ten trending purchases at that mall for those who match the demographic classification of the subscriber's social media cluster, or even the most popular items purchased at that location over the last week (or in general) by members of the subscriber's social media cluster or by any individual that has given the subscriber visibility rights to see their personal transaction profile. In certain embodiments, this block chain transaction history may be subject to data analytics so that targeted advertisements, marketing and other e-commerce offerings could be generated at a granularity not currently available.

In certain embodiments, the blockchain-based social media history map service may consider known demographic information for the subscriber, or for subscribers in a social media cluster, when generating trend reports. For example, in some embodiments, the service may have access to profile information that a given subscriber has made public on one or more of the social media applications associated with a social media account that the given subscriber has registered with the service. In other embodiments, when a given subscriber registers with the service, they may be asked to provide demographic information that can be used when filtering data to generate a trend report. The given subscriber might or might not be required to provide the requested information in order to register with the service. However, in certain embodiments, any demographic information that the given subscriber provides may be used by the service for data mining operations or other purposes. Examples of the demographic information that may be obtained by a social media history map service and used for data mining operations include age, gender, address information (e.g., city, state, region, or country of residency or of citizenship), political affiliation, religious affiliation, and/or any other information that may provide meaningful insights when used in filtering operations that generate trend reports based on online transaction information.

FIG. 2 illustrates an example schematic 200 for a social media history map data forest, according to one embodiment. In the illustrated embodiment, a data forest head node 202 is linked to three primary head nodes (shown as head nodes 204, 206, and 208), each representing a head node for a blockchain associated with a respective social media account owner who has multiple followers.

In the illustrated example, data forest head node 202 represents the root node for a particular data forest stored within a distributed blockchain database. The data forest may represent, for example, a collection of online transactions for one or more clusters of subscribers to a social media history map service. In some embodiments, data representing multiple data forests may be stored by a social media history map service in the same distributed blockchain database. In other embodiments, data representing each of multiple data forests may be stored by a social media history map service in separate distributed blockchain databases on the same underlying hardware devices, on different hardware devices, or on overlapping subsets of hardware devices.

In the illustrated example, the social media account owner associated with primary head node 204 has three followers, each of which is represented in the blockchain by a follower head node, such as follower head node 212. The social media account owner associated with primary head node 206 has two followers, each of which is represented in the blockchain by a follower head node. The social media account owner associated with primary head node 208 has four followers, each of which is represented in the blockchain by a follower head node.

In this example embodiment, each of the shaded blocks in the chains that begin with a primary head node represents a respective online transaction for the social media account owner associated with the primary head node. For example, shaded block 216 is the first block in a chain of blocks representing online transactions for the social media account owner associated with primary head node 208. Each of the unshaded blocks in the chains that begin with a follower head node represents a respective online transaction for the social media account owner associated with the follower head node. For example, unshaded block 214 represents the first block in a chain of blocks representing online transactions for the social media account owner associated with follower head node 212.

In various embodiments, a social media history map data forest may include more or fewer primary head nodes, each of which may be linked to any number of blocks representing online transactions for the social media account owner associated with the primary head node. Each primary head node may also be linked to any number of follower head nodes, each of which may be associated with a follower of the social media account owner associated with the primary head node. Each follower head node may be linked to any number of blocks representing online transactions for the social media account owner associated with the follower head node.

While the follower head nodes 204, 206, and 208 in the example social media history map data forest illustrated in FIG. 2 represent social media account owners (or, more specifically, subscribers to a social media history map service that follow another social media account owner/subscriber) and the blocks represent online transactions associated with those subscribers, in other embodiments, the "follower head nodes" may represent locations, events, activities, or instances of other types of categories or abstractions by which blocks representing transactions can be linked in the social media history map data forest.

In addition, while the social media history map data forest illustrated in FIG. 2 is depicted as a tree of chains, where each chain includes linked blocks each representing a respective transaction, in other embodiments, a social media history map data forest may be represented using another topology, such as a mesh or web topology. In such embodiments, each node may represent, for example, a person (e.g., a social media history map service subscriber, a social media account owner, or a social media account follower), a location, an event, an activity, or an instance of another type of category or abstraction that is associated with transactions of one or more transaction types.

As described in more detail herein, data representing a social media history map data forest, such as the social media history map data forest illustrated in FIG. 2, may be stored in a distributed blockchain database (such as distributed blockchain database 160 illustrated in FIG. 1) and may be managed and mined by a transaction history controller (such as transaction history controller 150 illustrated in FIG. 1). In certain embodiments, trend reports may be generated based on the whole data forest in accordance with specified filtering parameters. For example, the entire data forest may be mined for anonymized and aggregated online transaction data by location, event type, subject, social cluster profile, and/or individual follower demographics, in certain embodiments. In some embodiments, configurable visibility settings may determine how visible the information on each branch is, on an individual block basis, to users whose data is stored on other branches or in other trees, such as users who are not members of the same cluster of service subscribers.

Figure 3:
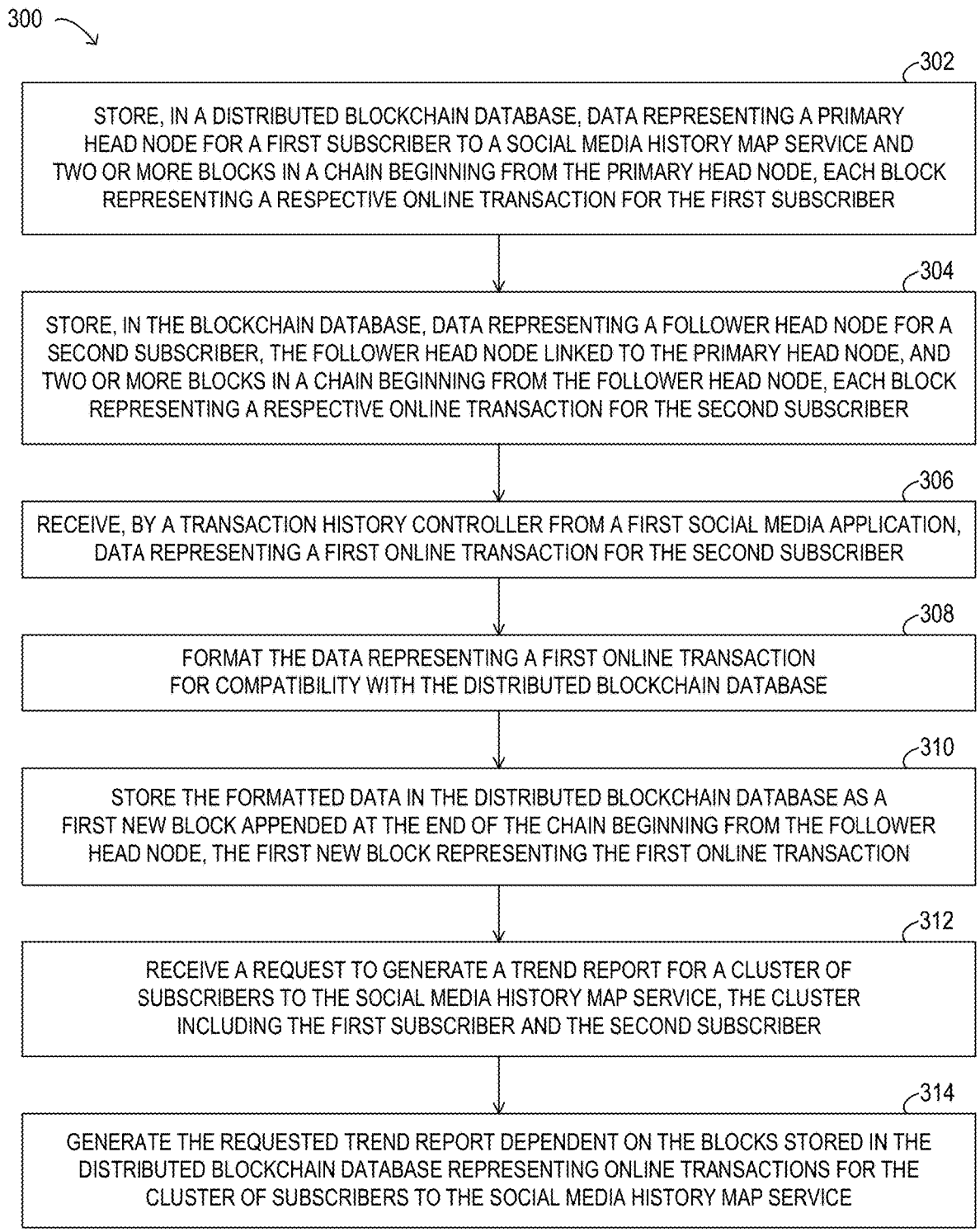
FIG. 3 is a flowchart illustrating an example embodiment of a method for implementing a blockchain-based social media history map service.

FIG. 3 is a flowchart illustrating an example embodiment of a method 300 for implementing a blockchain-based social media history map service. In certain embodiments, method 300 may be implemented by system 100 illustrated in FIG. 1.

In the illustrated embodiment, method 300 begins at step 302 by storing, in a distributed blockchain database, data representing a primary head node for a first subscriber to a social media history map service and two or more blocks in a chain beginning from the primary head node. Each block may represent a respective online transaction for the first subscriber. The online transaction may indicate a shopping behavior, the posting of content, attendance at an event, the presence of the first subscriber at a particular location, or, in general, any type of behavior or activity of the first subscriber that is captured by a social media application or by a utility application executing on a subscriber device.

The method includes, at 304, storing, in the blockchain database, data representing a follower head node for a second subscriber, and two or more blocks in a chain beginning from the follower head node, each block representing a respective online transaction for the second subscriber. In certain embodiments, the second subscriber may be a follower of the first subscriber, in which case the follower head node may be linked to the primary head node in the distributed blockchain database.

Method 300 includes, at 306, a transaction history controller receiving, from a first social media application, data representing a first online transaction for the second subscriber. In some embodiments, the data representing the first online transaction may be received from the first social media application in response to the initiation of a sync event on a subscriber device of the second subscriber.

At 308, the method includes the transaction history controller formatting the data representing a first online transaction for compatibility with the distributed blockchain database. For example, the two or more blocks in the chain beginning from the follower head node may include blocks representing online transactions captured by two or more social media applications, and the transaction history controller may include a respective transaction formatter for formatting online transactions captured by each of the two or more social media applications.

Method 300 includes, at 310, storing the formatted data in the distributed blockchain database as a first new block appended at the end of the chain beginning from the follower head node, the first new block representing the first online transaction. The method includes at 312, the transaction history controller receiving a request to generate a trend report for a cluster of subscribers to the social media history map service, where the cluster includes the first subscriber and the second subscriber. Method 300 includes, at 314, the transaction history controller generating the requested trend report dependent on the blocks stored in the distributed blockchain database representing online transactions for the cluster of subscribers to the social media history map service.

Modifications, additions, or omissions may be made to method 300 depicted in FIG. 3. Method 300 may include more, fewer, or different steps than those illustrated in FIG. 3. While described in terms of subscribers to a social media history map service, in other embodiments, method 300 may be implemented in a social media history map service in which the primary head node and/or follower head nodes represent locations, events, activities, or instances of other types of categories or abstractions by which blocks representing transactions can be linked in a social media history map data forest. While described above in terms of specific components that complete the steps of method 300, any suitable component of system 100 may perform any step of method 300.

Figure 4:
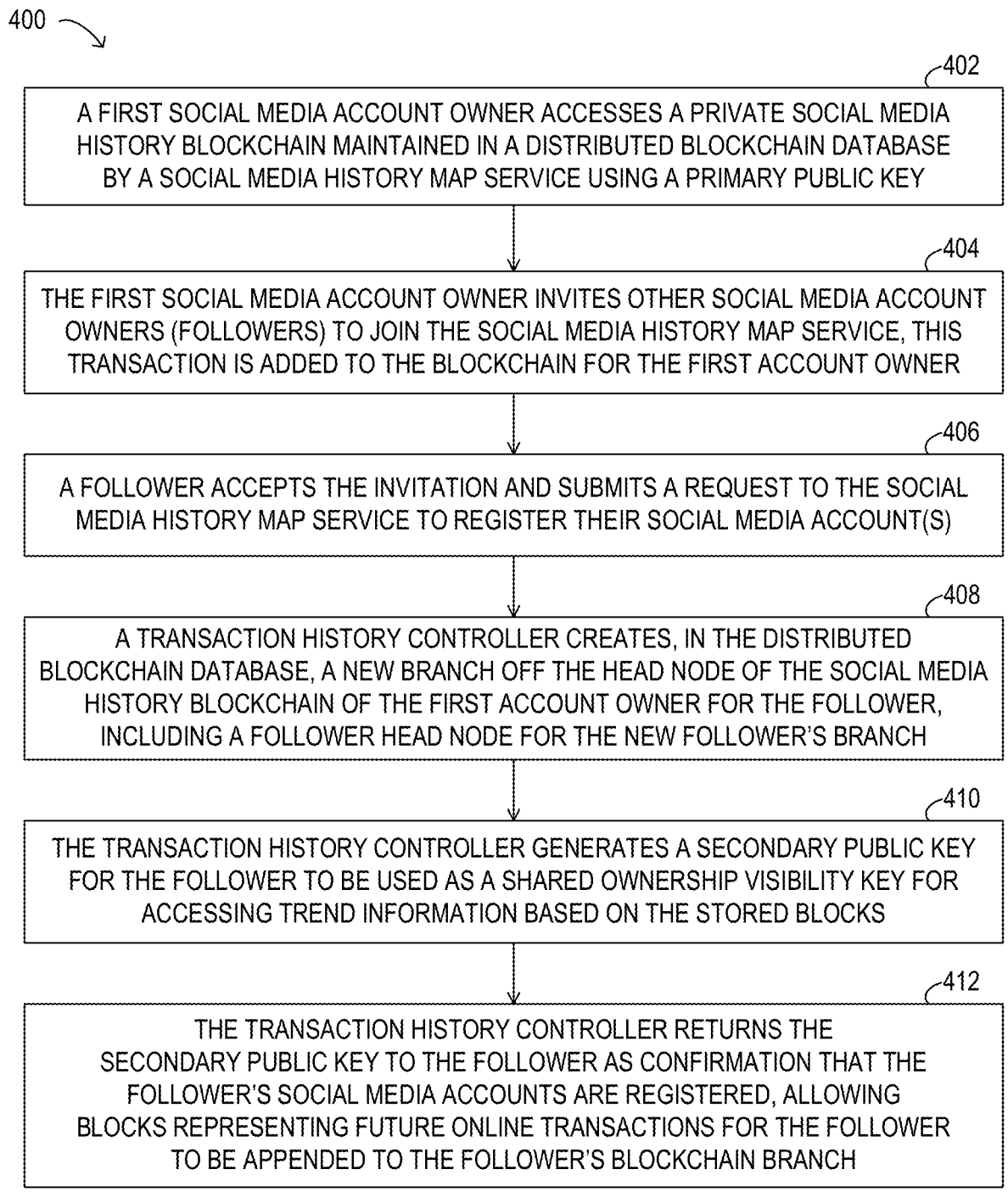
FIG. 4 is a flowchart illustrating an example embodiment of a method for registering a social media account with a blockchain-based social media history map service.
Figure 5:
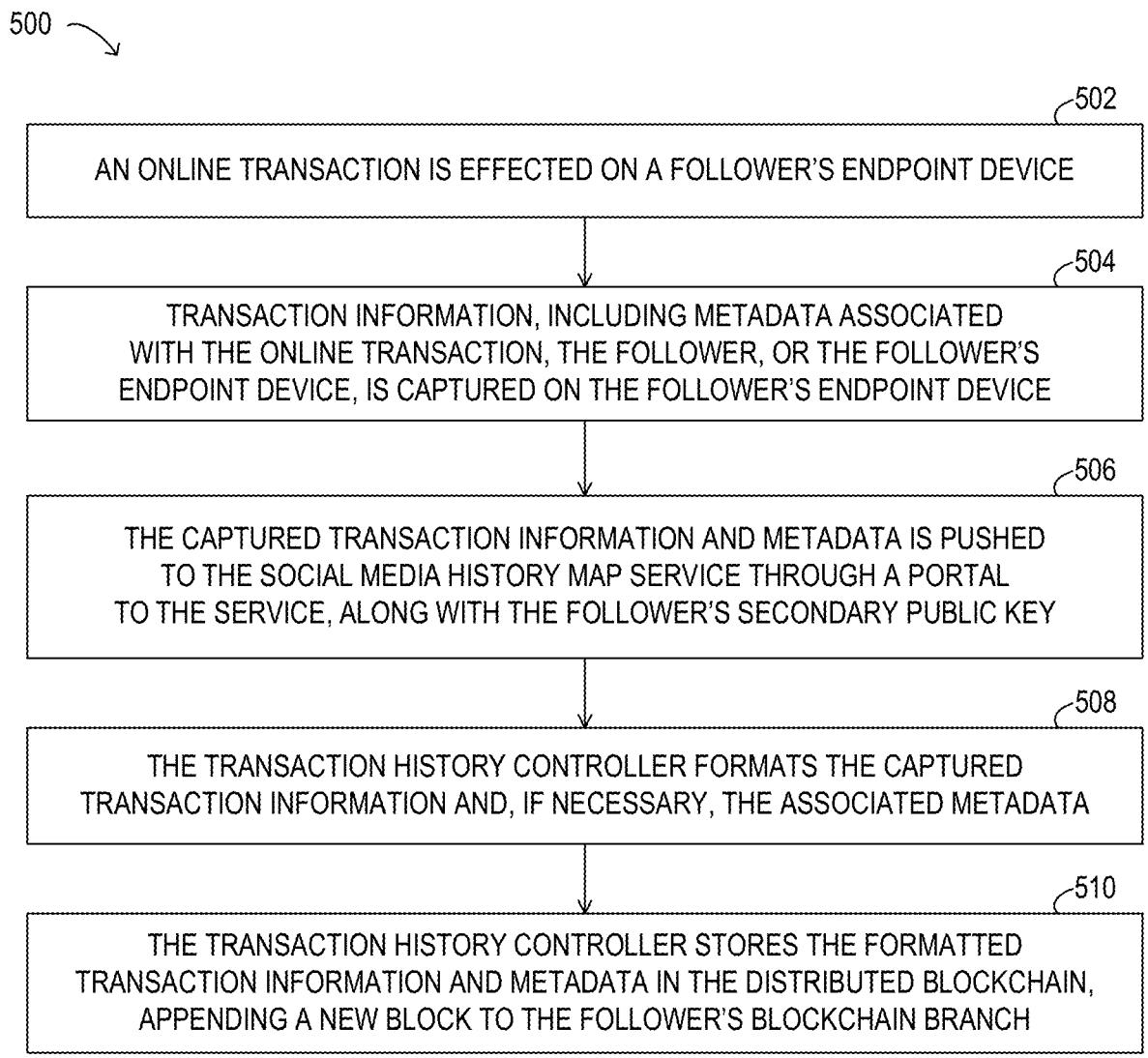
FIG. 5 is a flowchart illustrating an example embodiment of a method for collecting social media histories from service subscribers.

In certain embodiments, once a social media account owner syncs their social media accounts to a blockchain-based social history map service (as illustrated in FIG. 4 and described below), their followers may be given the option of joining the blockchain-based social history map service (as illustrated in FIG. 5 and described below). The result may allow the social media account owner and their followers to request and/or receive trend data and other insights into the online behavior of the subscriber in their social media cluster (see FIG. 6). In some embodiments, the subscriber may have access to an anonymous aggregation of trend data over the entire social history map data forest, where data representing online transactions for individual social media account owners and their followers are visible only as aggregated by various demographic classifications.

FIG. 4 is a flowchart illustrating an example embodiment of a method 400 for registering a social media account with a blockchain-based social media history map service. In certain embodiments, method 400 may be implemented by system 100 illustrated in FIG. 1.

In the illustrated embodiment, method 400 begins at step 402, with a first social media account owner accessing a private social media history blockchain maintained in a distributed blockchain database by a social media history map service using a primary public key. Method 400 includes, at 404, the first social media account owner inviting other social media account owners (e.g., followers of the first social media account owner) to join the social media history map service. This transaction may be added to the blockchain for the first social media account owner.

Method 400 includes, at 406, a follower accepting the invitation to join the social media history map service and submitting a request to the social media history map service to register one or more of their social media accounts. In certain embodiments, the registration request may specify default visibility parameters for online transactions of the follower. In one example, the default visibility parameters may include a default granularity at which data within blocks representing online transactions of the follower that are stored in the distributed blockchain database is to be visible by the first social media account owner, by followers of the first social media account owner, or by followers of the follower who has accepted the invitation request and is registering to join the service. In another example, the default visibility parameters may include an indication of whether data stored in the distributed blockchain database on behalf of the follower is to be visible to users in the same social media cluster as the follower on an individual online transaction basis or only in the aggregate along with data stored in other blocks in the distributed blockchain database. Note that, in some cases, none of the followers of the first social media account accept the invitation to join the social media history map service, instead choosing to opt-out of the service (not shown).

Method 400 includes, at 408, a transaction history controller creating, in the distributed blockchain database, a new branch off the head node of the social media history blockchain of the first account owner for the follower, including a follower head node for the new follower's branch that is linked to the head node of the social media history blockchain of the first account owner.

The method includes, at 410, the transaction history controller generating a secondary public key for the follower to be used as a shared ownership visibility key for accessing trend information based on the blocks stored in the distributed blockchain database.

Method 400 includes, at 412, the transaction history controller returning the secondary public key to the follower as confirmation that the follower's social media accounts are registered. This may allow blocks representing future online transactions for the follower to be appended to the end of the follower's blockchain branch. In addition, any future online transactions for which blocks are added to the chain for the first account owner may be visible to the follower. In certain embodiments, after the follower's social media accounts are registers, when a block representing an online transaction for the follower, the first account owner, or another follower of the first account owner is added to the appropriate chain in the distributed blockchain database, the users in the social media circle may receive a push notification. In other embodiments, when a block containing data representing an online transaction for the follower, the first account owner, or another follower of the first account owner is added to the appropriate chain in the distributed blockchain database, there may not be a push notification to the users in the social media circle. However, the data representing the online transaction may be incorporated into the collective knowledge maintained by the social media history map service, where it may affect the results of subsequently generated trend reports.

Modifications, additions, or omissions may be made to method 400 depicted in FIG. 4. Method 400 may include more, fewer, or different steps than those illustrated in FIG. 4. While described above in terms of specific components that complete the steps of method 400, any suitable component of system 100 may perform any step of method 400.

As described above, the social media history map platforms and services described herein may integrate blockchain transaction data accumulation into social media feeds. In certain embodiments, existing blockchain transaction metadata may be enhanced and extended to include one or more of the following fields.

Location: this field may include data indicating a location at which an online transaction took place or another location associated with an online transaction. For example, when the online transaction is a shopping event, the data in this field may indicate the location of the user on whose behalf the online transaction occurred when the online transaction occurred. In another example, when the online transaction is attendance by the user at an event, the data in this field may indicate the location of the event. In yet another embodiment, this field may indicate location information with which a social media feed was automatically tagged by a social media application on which an online transaction occurred or by a utility application executing on a subscriber device.

Visibility grade: this field may include data indicating one or more visibility settings with which the online transaction data was tagged by the social media history map service. The value of this field may be dependent on a default visibility setting that was specified by the user (e.g., when registering a social media account with the social media history map service) and/or by a visibility setting that was specified by the user for an individual block to be stored in the distributed blockchain database or for any collection of blocks in a chain or sub-chain associated with the user, as described herein.

Event type: this field may include data indicating the type of a captured online transaction. In certain embodiments, this field may indicate an event type with which online transaction data was tagged by the social media history map service. In other embodiments, this field may indicate event type information with which a social media feed was automatically tagged by a social media application on which an online transaction occurred or by a utility application executing on a subscriber device. In some embodiments, the social media history map service may define a default set of event types with which online transaction data may (optionally) be tagged. For example, a default set of event types may include one or more of the following event types: purchase, comment, activity, and attendance. In certain embodiments, the event type may be determined from the online transaction data from a social media application. In certain embodiments, in addition to default event systems, a user or administrator of the social media history map service, or the user associated with a head node in the distributed blockchain database, may define, and tag particular blocks in their chain with, a subtype or archetype that is more specific to their interests. However, if these blocks are also tagged with a default event type, this may provide backward compatibility with existing data mining operations and services.

Subject: this field may include data representing other types of tags or search terms that can be used as filtering parameters in subsequent mining operations. In certain embodiments, this field may include a comment field into which a user, through a social media application or a utility application executing on a subscriber device, can add notes that may or may not be visible to users in the same social media circle or other users of the service.

Rating: this field may include data representing vote counts (e.g., number of positive or negative votes), or any type of rating information with which online transaction data was tagged by a social media application or a utility application executing on a subscriber device. In certain embodiments, this information may be used as a filtering parameter during data mining operations.

FIG. 5 is a flowchart illustrating an example embodiment of a method 500 for collecting social media histories from social media history map service subscribers. In certain embodiments, method 500 may be implemented by system 100 illustrated in FIG. 1.

Method 500 begins at step 502, where an online transaction is effected on a follower's endpoint device. The method includes, at 504, the follower's endpoint device capturing transaction information, including metadata associated with the online transaction, the follower, or the follower's endpoint device. For example, the metadata information may include one or more of the following: location information associated with the first online transaction, a visibility grade associated with the first online transaction, an event type associated with the first online transaction, a subject associated with the first online transaction, and rating information associated with the first online transaction. In the illustrated example, method 500 includes, at 506, pushing the captured transaction information and metadata to the social media history map service through a portal to the service, along with the follower's secondary public key.

Method 500 includes, at 508, the transaction history controller formatting the captured transaction information and, if necessary, the associated metadata, for compatibility with the distributed blockchain database. For example, the transaction history controller may include a respective transaction formatter for formatting online transactions captured by each of multiple social media applications, or by collections social media applications that capture online transaction data having different formats. The method includes, at 510, the transaction history controller storing the formatted transaction information and metadata in the distributed blockchain, which includes appending a new block to the follower's blockchain branch.

Modifications, additions, or omissions may be made to method 500 depicted in FIG. 5. Method 500 may include more, fewer, or different steps than those illustrated in FIG. 5. While described above in terms of specific components that complete the steps of method 500, any suitable component of system 100 may perform any step of method 500.

In certain embodiments, social media history map service subscribers may interact with the social media history map platforms and services described herein through a dedicated portal to the social media history map service. For example, the social media history map service may include a web-based portal through which users may subscribe to the service, register one or more social media accounts, specify default or specific visibility parameters, or submit requests for and receive trend reports. In certain embodiments, the social media history map service may include a user interface portal that supports a rich collection of service options for use on full-featured subscriber devices, including advanced filtering options for generating trend reports for very specific contexts. In certain embodiments, the social media history map service may include a lighter version of the user interface portal for use on various mobile subscriber devices.

Figure 6:
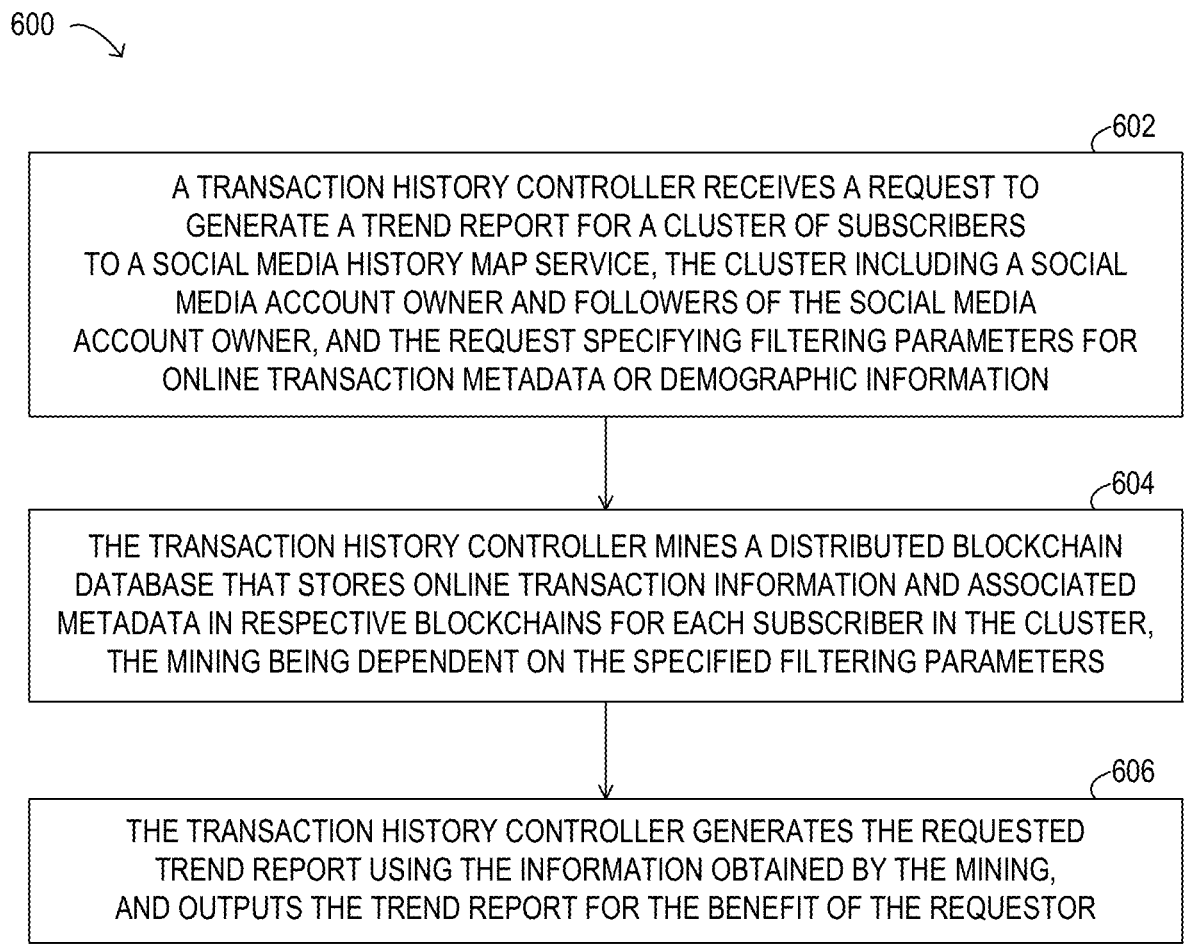
FIG. 6 is a flowchart illustrating an example embodiment of a method for generating and publishing trend data by a blockchain-based social media history map service.

FIG. 6 is a flowchart illustrating an example embodiment of a method 600 for generating and publishing trend data by a blockchain-based social media history map service. In certain embodiments, method 600 may be implemented by system 100 illustrated in FIG. 1.

Method 600 begins at step 602, with a transaction history controller receiving a request to generate a trend report for a cluster of subscribers to a social media history map service. The cluster of subscribers may include a social media account owner and one or more followers of the social media account owner. The request may specify filtering parameters for online transaction metadata or demographic information. For example, the filtering parameters may be dependent on metadata stored in blocks within chains for subscribers in the cluster of subscribers or on demographic information for subscribers in the cluster of subscribers. In certain embodiments, the request may be received from a member of the cluster. The request may include a primary or secondary public key, as described herein.

Method 600 includes, at 604, the transaction history controller mining a distributed blockchain database that stores online transaction information and associated metadata in respective blockchains for each subscriber in the cluster. The mining may be dependent on the filtering parameters that were specified in the request. The method includes, at step 606, the transaction history controller generating the requested trend report using the information obtained by the mining, and outputting the trend report for the benefit of the requestor.

Modifications, additions, or omissions may be made to method 600 depicted in FIG. 6. Method 600 may include more, fewer, or different steps than those illustrated in FIG. 6. While described above in terms of specific components that complete the steps of method 600, any suitable component of system 100 may perform any step of method 600.

FIG. 7 is a block diagram illustrating an example embodiment of a computing system 700 for implementing a blockchain-based social media history map service. In certain embodiments, computing system 700 may be one of multiple computing systems that collectively implement a blockchain-based social media history map platform. In other embodiments, computing system 700 may be a subscriber device, such as subscriber devices 102 and 122, through which a user or a user's social media applications interact with a blockchain-based social media history map service.

In this example embodiment, computing system 700 includes one or more processors 710-1-710-N (collectively, "processors 710"). Each of processors 710 may include any electronic circuitry or logic to interpret or execute program instructions and/or to process data. For example, each processor 710 may include a microprocessor, microcontroller, digital signal processor (DSP), graphics processor, application specific integrated circuit (ASIC), and/or a state machine, in different embodiments. In some embodiments, processors 710 may interpret and/or execute program instructions and/or process data stored locally in memory subsystem 720 or remotely (not shown).

Processors 710 may implement any instruction set architecture (ISA), in different embodiments. In some embodiments, all of the processors 710 may implement the same ISA. In other embodiments, two or more of processors 710 may implement different ISAs. Any one or more of processors 710 may be 8-bit, 16-bit, 32-bit, 64-bit processors or processor of any other suitable architecture. Any one or more of processors 710 may include an arithmetic logic unit (ALU) for performing arithmetic and logic operations, processor registers that supply operands to the ALU and store the results of ALU operations, and a control unit that fetches instructions from memory subsystem 720 and executes them by directing the coordinated operations of the ALU, registers and other components. Any one or more of processors 710 may include other hardware and software that operates to control and process information. Any one or more of processors 710 may execute software (shown as program instructions 730) stored in memory subsystem 720 to perform any of the functions described herein. Any one or more of processors may control the operation and administration of the device by processing information received from network 135 and/or any suitable component of system 100. Any one or more of processors may be a programmable logic device, a microcontroller, a microprocessor, any suitable processing device, or any suitable combination of the preceding. In certain embodiments, computing system 700 may include only a single processor 710.

Processors 710 are coupled to a memory subsystem 720 and an input/output subsystem 750 via a system interface 715. System interface 715 may implement any of a variety of suitable bus architectures and protocols including, but not limited to, a Micro Channel Architecture (MCA) bus, Industry Standard Architecture (ISA) bus, Enhanced ISA (EISA) bus, Peripheral Component Interconnect (PCI) bus, PCI-Express bus, or a HyperTransport (HT) bus.

Memory subsystem 720 may store, either permanently or temporarily, data, operational software, or other information for processors 710. Memory subsystem 720 may include a computer-readable non-transitory storage medium, in some embodiments. Memory subsystem 720 may include any one or a combination of volatile or non-volatile local or remote devices suitable for storing information. For example, memory subsystem 720 may include random access memory (RAM), read-only memory (ROM), electrically erasable programmable read-only memory (EEPROM), flash memory, magnetic storage, opto-magnetic storage, and/or any other type of volatile or non-volatile memory. In some embodiments, memory subsystem 720 may include computer-readable media, e.g., a hard disk drive, floppy disk drive, CD-ROM, and/or other type of rotating storage media, and/or another type of solid state storage media.

In the example embodiment illustrated in FIG. 7, memory subsystem 720 includes program instructions 730, including program instructions that when executed by one or more of the processors 710 implement some or all of the methods described herein for providing a blockchain-based social media history map service. As shown in the illustrated example, program instructions 730 may include program instructions for implementing one or more operating system 732, a transaction history controller 734, a distributed blockchain database application 736, and one or more other applications or services, shown as 738. In the example embodiment illustrated in FIG. 7, data storage 740 may include storage for a distributed blockchain database (shown as 745) and storage for one or more operating systems, applications, or services (shown as 755). For example, data storage 740 may store data representing a social media history map data forest, including one or more primary head nodes, one or more follower head nodes, and a plurality of blocks each representing an online transaction, such as in the example data forest illustrated in FIG. 2. In another example, data storage 740 may include storage for one or more private or public keys, such as the shared ownership visibility keys described herein.

In the example embodiment illustrated in FIG. 7, input/output subsystem 750 may implement any of a variety of digital and/or analog communication interfaces, graphics interfaces, video interfaces, user input interfaces, and/or peripheral interfaces for communicatively coupling input/output devices or other remote devices to the components of computing system 700, such as one or more input/output devices 760.

Modifications, additions, or omissions may be made to computing system 700 without departing from the scope of the disclosure. For example, in various embodiments, computing system 700 may include any number of processors 710, memory subsystems 720, interfaces 715, and/or input/output subsystems 750. In different embodiments, computing system 700 may include some, none, or all of the components illustrated in FIG. 7.

As described herein, a social media history map platform may include a transaction history controller configured to store, in a distributed blockchain database, a first chain including data representing a primary head node for a first subscriber to a social media history map service and multiple blocks each representing an online transaction for the first subscriber, and a second chain including data representing a follower head node for a second subscriber, the follower head node being linked to the primary head node, and multiple blocks each representing an online transaction for the second subscriber. The transaction history controller may receive, data representing a first online transaction for the second subscriber, format the data for compatibility with the distributed blockchain database, store the formatted data as new block in the second chain, receive a request to generate a trend report for a cluster of subscribers that includes first subscriber and the second subscriber, and generate the trend report dependent on the blocks in the first and second chains.

In certain embodiments, the systems described herein may provide users with a platform-agnostic, almost universal distributed blockchain database that consolidates social media from multiple feeds and multiple devices. These systems may also provide the ability to analyze and provide insights gleaned from this information in a real-time manner to create rich, multidimensional profiles of clusters of social media account owners and followers and to be able to create a marketing persona for those social media clusters. For example, data mining and analysis may be performed not only at the level of an entire data forest stored in a distributed blockchain database, but also for particular social media clusters of social media account owners and followers, which may facilitate the discovery trends and patterns within these relationships.

In certain embodiments, the social media history map platforms described herein may interact with the servers that provide the various social media applications and services from which online transaction data is captured for storage in the distributed blockchain database. In some such embodiments, service level agreements between the social media history map service and these social media services may allow the social media history map service to obtain online transaction data from the social media services rather than by intercepting social media feeds.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

The invention claimed is:

1. A system comprising:
a distributed blockchain database; and
at least one processor having access to a memory subsystem, wherein the memory subsystem stores instructions executable by the at least one processor that, when executed by the at least one processor, cause the at least one processor to perform operations comprising
storing, in the distributed blockchain database, data representing a primary head node for a first subscriber to a social media history map service, wherein two or more blocks in a first chain begin from the primary head node, and wherein each block in the first chain represents a respective online transaction for the first subscriber,
storing, in the distributed blockchain database, data representing a follower head node for a second subscriber to the social media history map service, wherein the second subscriber is a follower of the first subscriber on one or more social media platforms, wherein the follower head node is linked to the primary head node, wherein two or more blocks in a second chain begin from the follower head node, and wherein each block in the second chain represents a respective online transaction for the second subscriber,
receiving, from a first social media application, data representing a first online transaction associated with the second subscriber, and
storing the data representing the first online transaction associated with the second subscriber in the distributed blockchain database as a first new block appended to the end of the second chain, wherein the first new block represents the first online transaction associated with the second subscriber.

2. The system of claim 1, wherein the operations further comprise generating, in response to a request to generate a trend report for a cluster of subscribers to the social media history map service, the trend report dependent on the blocks in the first chain and the blocks in the second chain, wherein the cluster of subscribers includes at least the first subscriber and the second subscriber.

3. The system of claim 1, wherein the two or more blocks in the second chain represent online transactions captured by two or more social media applications.

4. The system of claim 1, wherein the operations further comprise:
receiving, from a second social media application, data representing a second online transaction associated with the second subscriber; and
storing the data representing the second online transaction in the distributed blockchain database as a second new block appended at the end of the second chain, the second new block being linked to the first new block, and the second new block representing the second online transaction.

5. The system of claim 1, wherein the data representing the first online transaction is received from the first social media application in response to initiation of a sync event on a subscriber device of the second subscriber.

6. The system of claim 1, wherein the data representing the first online transaction comprises metadata associated with the first online transaction.

7. The system of claim 6, wherein the metadata comprises one or more of the following:
location information associated with the first online transaction,
a visibility grade associated with the first online transaction,
an event type associated with the first online transaction,
a subject associated with the first online transaction, or
rating information associated with the first online transaction.

8. The system of claim 1, wherein the operations further comprise:
receiving, prior to receiving the data representing the first online transaction, a request associated with the second subscriber to register a social media account of the second subscriber with the social media history map service, the social media account being associated with one or more social media applications that include the first social media application; and
generating a shared ownership visibility key for the second subscriber, wherein the shared ownership visibility key allows the second subscriber to view encrypted metadata associated with the first online transaction.

9. The system of claim 8, wherein the request specifies default visibility parameters for online transactions of the second subscriber, the default visibility parameters comprising a default granularity at which data within blocks representing the online transactions of the second subscriber that are stored in the distributed blockchain database is visible by one or more of the first subscriber, followers of the first subscriber other than the second subscriber, and followers of the second subscriber.

10. The system of claim 8, wherein the request specifies default visibility parameters for online transactions of the second subscriber, the default visibility parameters comprising an indication of whether the data stored in the first new block in the distributed blockchain database is visible to subscribers in a cluster of subscribers other than the second subscriber on an individual online transaction basis or is visible to the subscribers in the cluster of subscribers other than the second subscriber only in the aggregate along with data stored in other blocks in the distributed blockchain database.

11. A method comprising:
storing, by a system, in a distributed blockchain database, data representing a primary head node for a first subscriber to a social media history map service, wherein two or more blocks in a first chain begin from the primary head node, and wherein each block in the first chain represents a respective online transaction for the first subscriber;
storing, by the system, in the distributed blockchain database, data representing a follower head node for a second subscriber to the social media history map service, wherein the second subscriber is a follower of the first subscriber on one or more social media platforms, wherein the follower head node is linked to the primary head node, wherein two or more blocks in a second chain begin from the follower head node, and wherein each block in the second chain represents a respective online transaction for the second subscriber;
receiving, by the system, from a first social media application, data representing a first online transaction associated with the second subscriber; and
storing, by the system, the data representing the first online transaction associated with the second subscriber in the distributed blockchain database as a first new block appended to the end of the second chain, wherein the first new block represents the first online transaction associated with the second subscriber.

12. The method of claim 11, further comprising generating, in response to a request to generate a trend report for a cluster of subscribers to the social media history map service, the trend report dependent on the blocks in the first chain and the blocks in the second chain, wherein the cluster of subscribers includes at least the first subscriber and the second subscriber.

13. The method of claim 11, wherein the two or more blocks in the second chain represent online transactions captured by two or more social media applications.

14. The method of claim 11, further comprising:
receiving, from a second social media application, data representing a second online transaction associated with the second subscriber; and
storing the data representing the second online transaction in the distributed blockchain database as a second new block appended at the end of the second chain, the second new block being linked to the first new block, and the second new block representing the second online transaction.

15. The method of claim 11, wherein the data representing the first online transaction is received from the first social media application in response to initiation of a sync event on a subscriber device of the second subscriber.

16. The method of claim 11, wherein the data representing the first online transaction comprises metadata associated with the first online transaction, and wherein the metadata comprises one or more of the following:
location information associated with the first online transaction,
a visibility grade associated with the first online transaction,
an event type associated with the first online transaction, a subject associated with the first online transaction, or rating information associated with the first online transaction.

17. The method of claim 11, further comprising:
receiving, prior to receiving the data representing the first online transaction, a request associated with the second subscriber to register a social media account of the second subscriber with the social media history map service, the social media account being associated with one or more social media applications that include the first social media application; and
generating a shared ownership visibility key for the second subscriber, wherein the shared ownership visibility key allows the second subscriber to view encrypted metadata associated with the first online transaction.

18. The method of claim 17, wherein the request specifies default visibility parameters for online transactions of the second subscriber, the default visibility parameters comprising a default granularity at which data within blocks representing the online transactions of the second subscriber that are stored in the distributed blockchain database is visible by one or more of the first subscriber, followers of the first subscriber other than the second subscriber, and followers of the second subscriber.

19. The method of claim 17, wherein the request specifies default visibility parameters for online transactions of the second subscriber, the default visibility parameters comprising an indication of whether the data stored in the first new block in the distributed blockchain database is visible to subscribers in a cluster of subscribers other than the second subscriber on an individual online transaction basis or is visible to the subscribers in the cluster of subscribers other than the second subscriber only in the aggregate along with data stored in other blocks in the distributed blockchain database.

20. At least one non-transitory computer-readable storage medium for storing instructions that, when executed by at least one processor of a system, cause the system to perform operations comprising:
storing, in a distributed blockchain database, data representing a primary head node for a first subscriber to a social media history map service, wherein two or more blocks in a first chain begin from the primary head node, and wherein each block in the first chain represents a respective online transaction for the first subscriber;
storing, in the distributed blockchain database, data representing a follower head node for a second subscriber to the social media history map service, wherein the second subscriber is a follower of the first subscriber on one or more social media platforms, wherein the follower head node is linked to the primary head node, wherein two or more blocks in a second chain begin from the follower head node, and wherein each block in the second chain represents a respective online transaction for the second subscriber;
receiving, from a social media application, data representing an online transaction associated with the second subscriber; and
storing the data representing the online transaction associated with the second subscriber in the distributed blockchain database as a new block appended to the end of the second chain, wherein the new block represents the online transaction associated with the second subscriber.

\* \* \* \* \*